US012274965B2

(12) United States Patent
Toebak et al.

(10) Patent No.: US 12,274,965 B2
(45) Date of Patent: Apr. 15, 2025

(54) FILTER BAG SUPPORT SYSTEM, A BAG HOUSE EQUIPMENT AND A METHOD FOR INSTALLING A FILTER BAG

(71) Applicant: Tetra Laval Holdings & Finance S.A., Pully (CH)

(72) Inventors: Joost Toebak, Sneek (NL); Diego Dibartolo, Oberhausen (DE); Elvan Cavus, Groningen (NL)

(73) Assignee: Tetra Laval Holdings & Finance S.A., Pully (CH)

( * ) Notice: Subject to any disclaimer, the term of this patent is extended or adjusted under 35 U.S.C. 154(b) by 170 days.

(21) Appl. No.: 17/789,206

(22) PCT Filed: Jul. 2, 2021

(86) PCT No.: PCT/EP2021/068284
§ 371 (c)(1),
(2) Date: Jun. 26, 2022

(87) PCT Pub. No.: WO2022/008360
PCT Pub. Date: Jan. 13, 2022

(65) Prior Publication Data
US 2023/0338884 A1  Oct. 26, 2023

(30) Foreign Application Priority Data
Jul. 10, 2020 (EP) .................................... 20185239

(51) Int. Cl.
*B01D 46/02* (2006.01)
*B01D 46/00* (2022.01)
*B01D 46/42* (2006.01)
(52) U.S. Cl.
CPC ....... *B01D 46/026* (2013.01); *B01D 46/0005* (2013.01); *B01D 46/4227* (2013.01)

(58) Field of Classification Search
None
See application file for complete search history.

(56) References Cited

U.S. PATENT DOCUMENTS 4,014,672 A * 3/1977 Jansson .................. B01D 29/15
55/357
4,292,057 A * 9/1981 Ulvestad ............ B01D 46/0005
55/377

(Continued)

FOREIGN PATENT DOCUMENTS

DE       3045759 A1   6/1982
DE      20305310 U1   2/2004

(Continued)

OTHER PUBLICATIONS

Extended European Search Report issued Nov. 24, 2020, for priority European Patent Application No. 20185239.9.

(Continued)

*Primary Examiner* — Christopher P Jones
*Assistant Examiner* — Phillip Y Shao
(74) *Attorney, Agent, or Firm* — Renner, Otto, Boisselle & Sklar, LLP

(57) ABSTRACT

A filter bag support system arranged to support a filter bag for separating food powder and air, comprising a support cage arranged to be placed inside the filter bag, and a lock ring arranged to be placed inside a top section of the support cage, wherein the top section of the support cage is expandable in a radial direction by the lock ring which is arranged to expand the top section of the support cage in the radial direction, towards an edge of the opening of a cell plate when the filter bag support system is located in the cell plate and when the lock ring is rotated within the top section.

15 Claims, 5 Drawing Sheets

(56) References Cited

U.S. PATENT DOCUMENTS

| | | | | |
|---|---|---|---|---|
| 4,293,321 A | | 10/1981 | Kordas | |
| 5,202,021 A | * | 4/1993 | Griffin | B01D 46/02 |
| | | | | 210/232 |
| 5,308,369 A | * | 5/1994 | Morton | B01D 46/02 |
| | | | | 55/501 |
| 7,294,163 B1 | * | 11/2007 | LaCroix | B01D 46/2407 |
| | | | | 55/378 |
| 2013/0227921 A1 | * | 9/2013 | Appelo | B01D 46/02 |
| | | | | 55/378 |

FOREIGN PATENT DOCUMENTS

| | | |
|---|---|---|
| EP | 0034197 A2 | 8/1981 |
| KR | 20140059431 A | 5/2014 |

OTHER PUBLICATIONS

International Search Report mailed Oct. 11, 2021, for priority International Patent Application No. PCT/EP2021/068284.

* cited by examiner

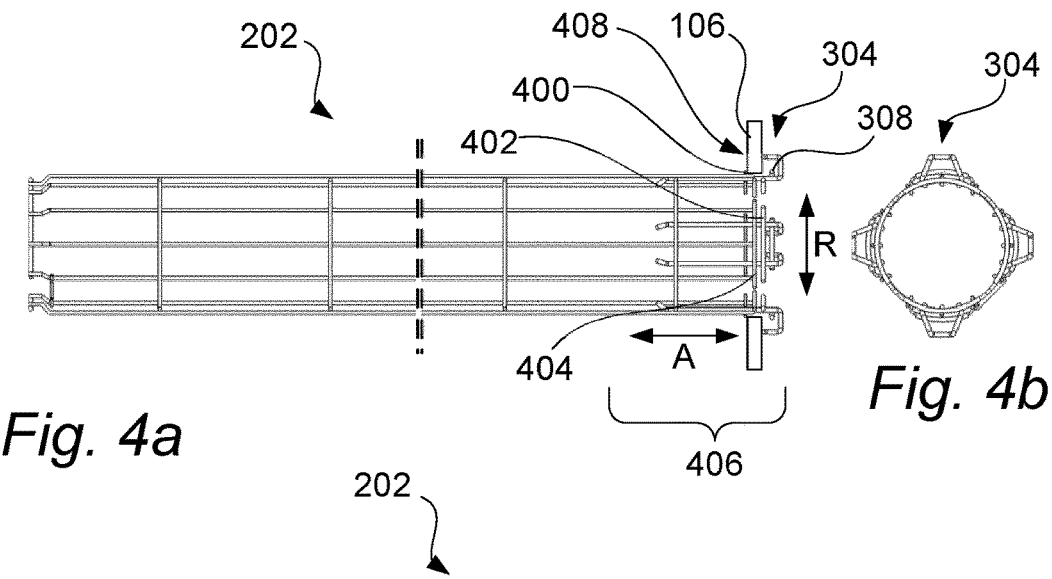
Fig. 4a
Fig. 4b
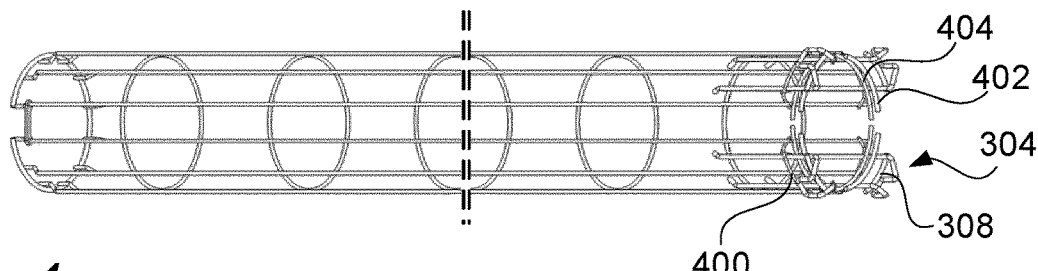
Fig. 4c
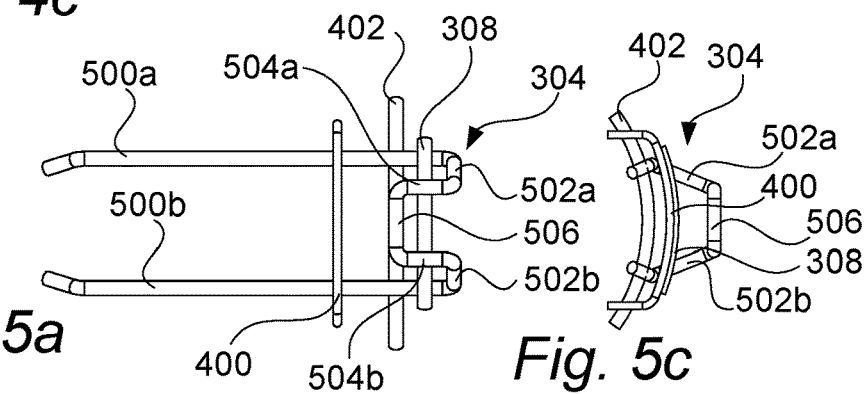
Fig. 5a
Fig. 5c
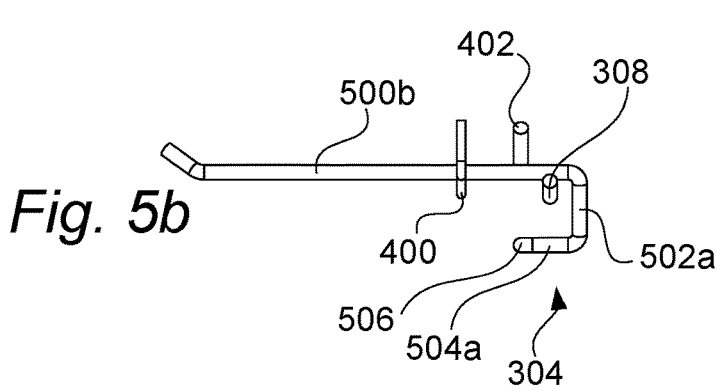
Fig. 5b
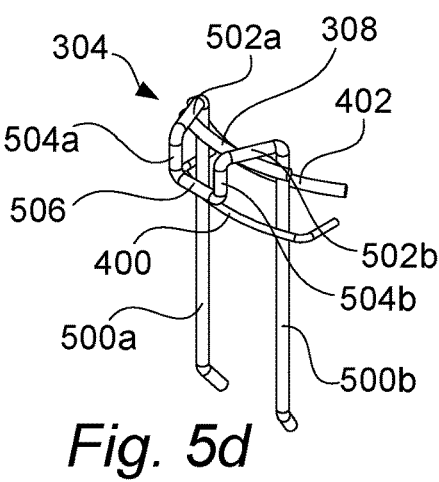
Fig. 5d

FILTER BAG SUPPORT SYSTEM, A BAG HOUSE EQUIPMENT AND A METHOD FOR INSTALLING A FILTER BAG

TECHNICAL FIELD

The invention relates to relates to food powder handling. More particularly, it relates to a filter bag support system that is arranged to support a filter bag for separating food powder and air when the filter bag is placed in an opening of a cell plate of a bag house equipment. The invention also relates to a bag-house equipment and a method for installing a filter bag in the bag house equipment.

BACKGROUND ART

Transforming fluid food products into solid food products by removing water is a well-known principle and is commonly used. In the dairy industry, milk, i.e. milk in a fluid state, can be transformed into milk powder, i.e. milk in a solid state. Another example from the dairy industry is whey transformed into whey powder. One reason for drying liquid food products is logistics. By removing water, which may be later added to create a so-called recombined product, weight and volume may be reduced, which facilitates transportation. Also, the shelf life may be increased by removing the water.

A common approach for removing water involves sing a spray dryer. The general principle of the spray dryer is to spray the food product in the liquid state into a top section of a vessel. The vessel can be filled with hot air such that droplets of the food products are transformed into powder particles as they fall down onto a bottom of the vessel. After being processed in the spray dryer the powder particles may be transferred to e.g. a fluidized bed for further processing.

To avoid contamination of the food products, a powder processing system is most often a closed system such that no bacteria or other unwanted microorganisms come in contact with the food products. In addition to controlling incoming air, outgoing air is often filtered to provide for that powder particles are kept within the system and not spread to surrounding areas. For filtering outgoing air, a bag house equipment can be used. This piece of equipment often comprises a number of parallel filter bags. The filter bags are often made of fabric.

The filter bags can be supported by support cages that are placed inside the filter bags. The support cages provide for that the filter bag are held in place and that nearby filter bags are not in contact with each other. Keeping the filter bags in place is relevant for filtering efficiency, i.e. providing for that powder particles are filtered out at a low cost. In addition to filtering efficiency, it is also relevant from a safety perspective that the filter bags are held in place adequately. Having nearby filter bags being in contact with each other could increase the risk that sparks arise due to static electricity.

Even though it is known to use support cages in bag house equipment for keeping filter bags in place, there is a need for an improvement such that the filtering efficiency can be improved and such that the risk of fires can be further reduced.

SUMMARY

It is an object of the invention to at least partly overcome one or more of the above-identified limitations of the prior art. In particular, it is an object to provide a support cage that can reliably hold a filter bag in place such that efficient filtering can be achieved and such that a risk that sparks occur can be reduced.

In general words, it has been realized that by having a filter bag support system that comprises a support cage and a lock ring made to interact with one another, a likelihood that the support cage is properly mounted can be increased. An effect of this is that efficient filtering can be achieved. Another positive effect is that a risk of fire caused by incorrectly mounted filter bags can be reduced.

According to a first aspect it is provided a filter bag support system arranged to support a filter bag for separating food powder and air when the filter bag is placed in an opening of a cell plate of a bag house equipment, said filter bag support system comprising a support cage arranged to be placed inside the filter bag, and a lock ring arranged to be placed inside a top section of the support cage, wherein the top section of the support cage is expandable in a radial direction R, and the lock ring is provided with a first section with a first radius R1 and a second section with a second radius R2, wherein the second radius R2 is greater than the first radius R1, wherein the second section is arranged to expand the top section of the support cage in the radial direction R towards an edge of the opening of the cell plate when the lock ring is rotated within the top section, such that the filter bag is clamped between the cell plate and the support cage.

An advantage of the above is that threaded elements, such as a threaded opening interacting with a threaded lock ring, can be avoided. By avoiding these elements a more hygienic design can be achieved, which is made possible due to that there is less risk for having food residues stuck.

The support cage may comprise hook elements that extend in the radial direction R from the top section and thereafter extends in the axial direction A, such that the hook elements rest on the cell plate when the support cage is placed in the cell plate. The hook elements reduces a risk that the support cage and the filter bag are incorrectly mounted, e.g. that filter bag is not held straight. This is advantageous because this provides for improved filtering as well as less risk that sparks occur. Still an advantage with the hook elements is that contact is achieved between the support cage and the cell plate. This provides for that the support cage can be earthed, which in turn provides for that there is no static electricity formed, which is advantageous from a fire risk perspective.

The hook elements may be provided with a first group of ring elements arranged, in combination with the cell plate, to fixate the filter bag. By having this first group of ring elements attached to the hook elements, a correct mounting of the support cage both provides for that the filter bag is held straight and that the filter bag is tightly fitted to the cell plate.

The top section may be provided with a second group of ring segments arranged to be pressed against an underside of the cell plate such that the support cage is prevented to move in axial direction AD by the first group of ring segments and the hook elements. An advantage with having the hook elements abutting on an upper side of the cell plate and the second group of ring elements abutting the underside is that the support cage is reliably held in place.

The support cage may be cylindrically shaped and may comprise 6 to 30 longitudinal wires and horizontal reinforcement rings spaced apart by 40 to 300 mm. An advantage with having the support cage made of spaced apart wires is that this can easily be kept clean. For instance, cleaning-in-place can be used, which has the effect that a down time for cleaning can be reduced. For instance, the wires may have round cross-section and may be made of aluminum or stainless steel.

The top section of the support cage may be provided with a third group of ring elements and a fourth group of ring elements which together hold (fixate) the lock ring, where the third and fourth groups of ring elements are arranged on a respective side of the lock ring. An advantage with using ring elements for holding the lock ring is that less interaction areas between the lock ring and the support cage are formed. This is beneficial since this in turn provides for that there are fewer areas that are difficult to clean.

The fourth group of ring elements, in mounted position in the cell plate placed below the second group of ring elements, may be provided with two to six slots such that flexibility in the radial direction R is provided. Further, the first, the second and the third group of ring elements may also be provided with two to six slots.

The lock ring may comprise a funnel for directing air. An advantage with this is that air fed into the filter bag for removing powder particles stuck on an outside of the filter bag can be directed and/or amplified efficiently, thereby providing for improved cleaning.

The funnel may be a venturi nozzle. The lock ring may be provided with two or more holes arranged to receive a mounting tool.

According to a second aspect it is provided a bag house equipment comprising a cell plate provided with at least one filter bag support system according to the first aspect.

According to a third aspect it is provided a method for installing a filter bag in a bag house equipment, said method comprising placing the filter bag in a hole in a cell plate of the bag house equipment, placing a support cage inside the filter bag, placing a lock ring in a top section of the support cage, wherein the lock ring is provided with a first section with a first radius R1 and a second section with a second radius R2, wherein the second radius R2 is greater than the first radius R1, and the top section of the support cage is expandable in a radial direction R, and rotating the lock ring such that the filter bag is clamped between the cell plate and the support cage.

In line with the advantages presented with reference to the first aspect, an advantage of the above is that threaded elements, such as a threaded opening interacting with a threaded lock ring, can be avoided. By avoiding these elements a more hygienic design can be achieved, which is made possible due to that there is less risk for having food residues stuck.

The method may further comprise placing hook elements of the support cage that extend in the radial direction R from the top section and thereafter extends in the axial direction A, such that the hook elements rest on the cell plate when the support cage is placed in the cell plate.

As presented above in view of the first aspect, the hook elements reduce a risk that the support cage and the filter bag are incorrectly mounted, e.g. that filter bag is not held straight. This is advantageous because this provides for improved filtering as well as less risk that sparks occur, which can happen easily in this type of equipment.

Still an advantage with the hook elements is that contact is achieved between the support cage and the cell plate. This provides for that the support cage can be earthed, which in turn provides for that there is no static electricity formed, which is advantageous from a fire risk perspective.

The top section may be provided with a second group of ring segments arranged to be pressed against an underside of the cell plate such that the support cage is prevented to move in axial direction A by the first group of ring segments and the hook elements. An advantage with having the hook elements abutting on the upper side of the cell plate and the second group of ring elements abutting the underside is that the support cage is reliably held in place.

The top section of the support cage may be provided with a third group of ring elements and a fourth group of ring elements arranged to in combination hold the lock ring. An advantage with using ring elements for holding the lock ring is that less interaction areas between the lock ring and the support cage are formed. This is beneficial since this in turn provides for that there are fewer areas that are difficult to clean.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 4a is a side view of a support cage of the filter bag support system, FIG. 4b is a top view of the support cage, FIG. 4c is a perspective view of the support cage, FIG. 5a is a front view of a hook element of the support cage, FIG. 5b is a side view of the hook element, FIG. 5c is a top view of the hook element, FIG. 5d is a perspective view of the hook element.

DETAILED DESCRIPTION

Figure 1:
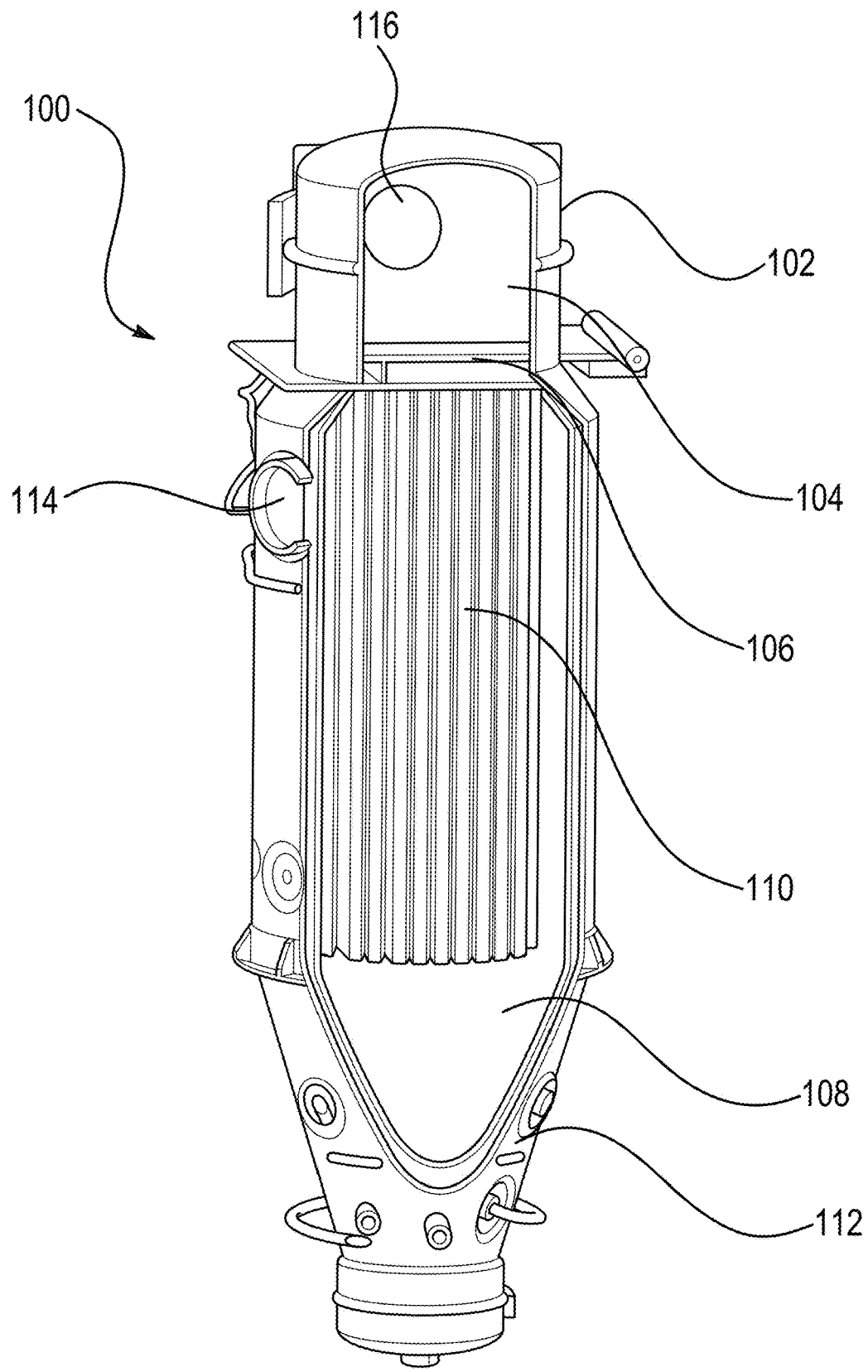
FIG. 1 illustrates a bag house equipment provided with a cell plate.

FIG. 1 illustrates a bag house equipment 100 by way of example. The bag house equipment 100 can comprise a dome 102 under which a clean air chamber 104 is provided. In the clean air chamber 104, a cell plate 106 is provided. This cell plate 106 separates the clean air chamber 104 from a dirty chamber 108 in which unfiltered air is provided.

In the cell plate 106, filter bags 110 are arranged. These filter bags 110 provide for that food powder particles are separated from the air as this is fed through the filter bags 110 into the clean air chamber 104. The filter bags 110 can be made of fabric or any other material suitable for filtering out powder particles from air. A lower part of the dirty chamber 108 may comprise a cone 112. Unfiltered (powder polluted) air may be fed into the dirty chamber 108 via an inlet 114. It flows through the filter bags 110 such that it thereby is filtered by the filter bags 110, through openings in the cell plate 106, into the clean air chamber 104 and thereafter out from the bag house equipment 100 via an outlet 116 in the dome 102.

Figure 2:
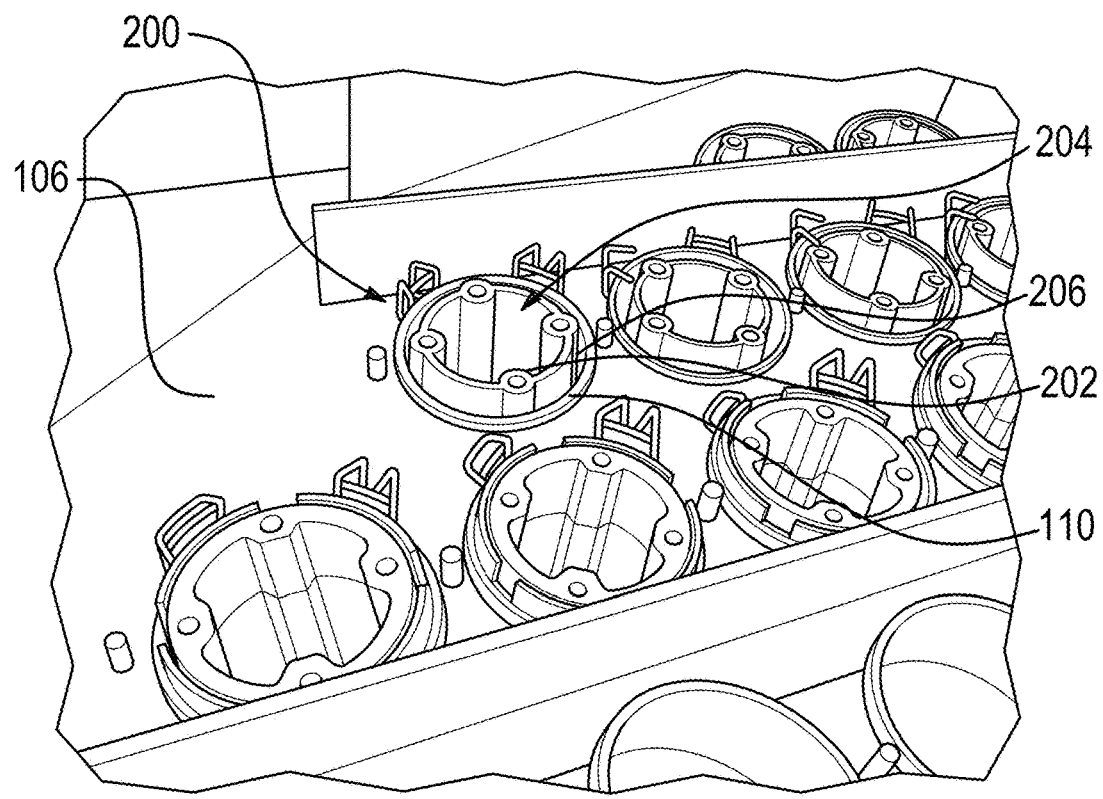
FIG. 2 illustrates a cell plate provided with a number of filter bags and filter bag support systems.

FIG. 2 illustrates the cell plate 106 and the filter bag 110 in further detail. As illustrated, a support cage system 200 comprising a support cage 202 is placed inside the filter bag 110 to provide for that this is held in place, which in turn provides for that efficient filtering can be achieved. Holding the filter bag 110 in place is relevant in normal operation when the air is fed from the dirty chamber 108, through the filter bag 110 and to the clean air chamber 104, but also when the air flow is reversed for removing powder particles from an outside of the filter bag, i.e. a side of the filter bag facing the dirty chamber 108.

The filter bag 100 and the support cage system 200 is placed in an opening 204 of the cell plate 106. The opening 204 has the shape of a circular hole in the cell plate 106. When the filter bag 110 and the support cage system 200 are mounted correctly, the filter bag 110 abuts an edge 206 of the opening 204.

Figure 3:
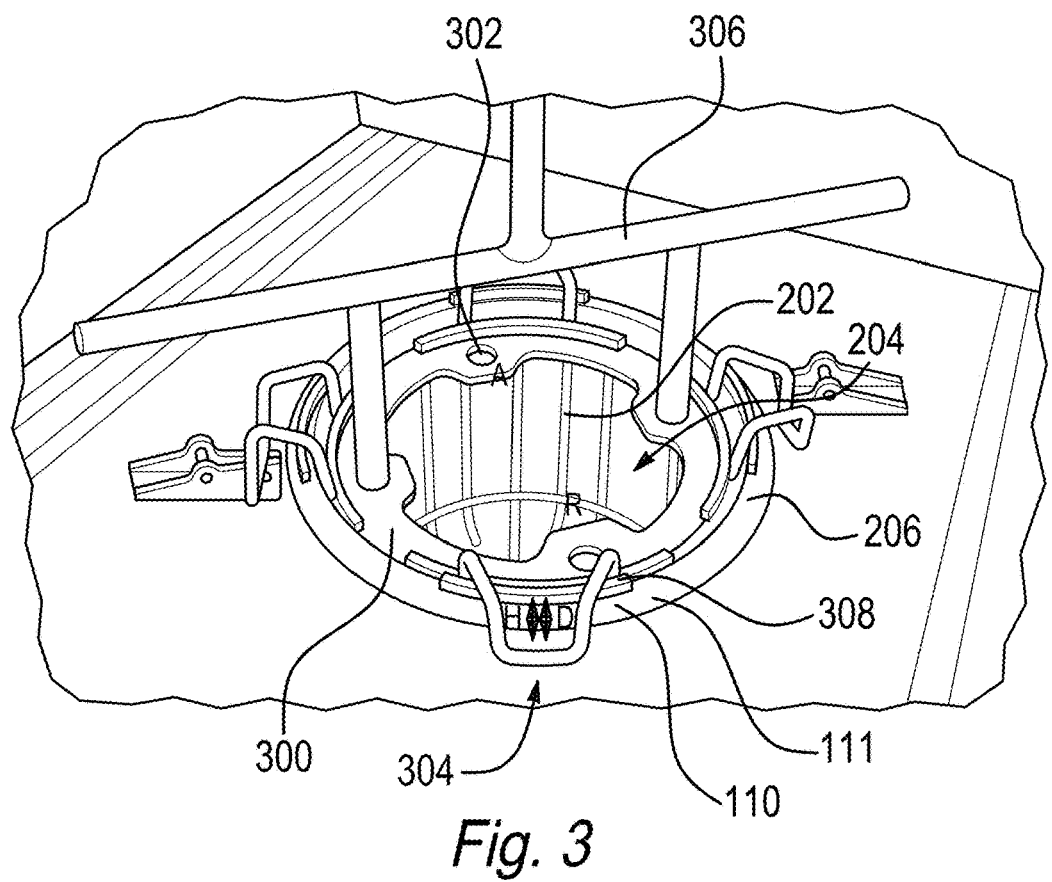
FIG. 3 illustrates one of the filter bags and filter bag support systems having a support cage and a lock ring.

As illustrated in FIG. 3, the support cage system 200 comprises a lock ring 300. The lock ring 300 can be provide with holes 302 for facilitating mounting of the lock ring 300 inside the support cage 202.

The support cage 202 can comprise hook elements 304 that, when the lock ring 300 is mounted inside the support cage 202, abut the cell plate 106. One advantage with this is that the support cage 202 is earthed, which in turn provides for that a risk that static electricity is formed inside the bag house equipment 100 is reduced. This is advantageous in that a risk is reduced that the filter bag 110 or other combustible material inside the bag house equipment 100 catch fire.

During mounting of the lock ring 300 in the support cage 202, a mounting tool 306 can be used. As illustrated, the mounting tool 306 is placed inside two of the holes 302 in the lock ring 300. Once placed in the holes 302, the mounting tool 306 can be rotated around an axial direction A of the support cage 202 such that the lock ring 300 is locked inside the support cage 202. The lock ring 300 is further illustrated in FIGS. 6a and 6b.

The hook elements 304 are provided with a first group of ring elements 308. This first group of ring elements 308 is arranged such that when tip sections of the hook elements 304 abut the cell plate 106, a snug fit for upper sections of the filter bags 110 is provided. In other words, interaction between the hook elements 304 and the cell plate 106 provide for that the filter bags 110 are held vertical, that is, contact with adjacent filter bags are avoided, and interaction between the first group of ring elements 308 and the cell plate 106 provides for that the filter bags 110 are prevented to move in axial direction A. Since the first group of ring elements 308 can be provided on the hook elements 304, a proper mounting will provide for that both the filter bag 110 is held straight and that the filter bag 110 is tightly fit to the cell plate 106.

The filter bag 110 may be provided in its upper section with a steel spring 111. If such steel spring is provided, as illustrated in FIG. 3, an axial distance D between the first group of ring elements 308 and the cell plate 106 corresponds to a height H of the steel spring embedded in the upper section of the filter bag 110. In FIG. 3 the steel spring, which has the form of a circular steel ring, cannot be seen as it is enclosed by the fabric of the filter bag 110.

FIG. 4a illustrates a side view of the support cage 202. As illustrated, a second group of ring elements 400 is used for holding the support cage 202 fixated in axial direction A with respect to the cell plate 106, which is illustrated in part in FIG. 4a. A third group of ring elements 402 and a fourth group of ring elements 404 are arranged to hold the lock ring 300. To accomplish this the third group of ring elements 402 abuts an upper side of the lock ring 300 while the fourth group of ring elements 404 abuts an underside of the lock ring 300.

Having groups of ring elements instead of a continuous ring in one piece is advantageous in that a top section 406 of the support cage 202 can flex in radial direction R. Thus, when rotating the lock ring 300 this can, as explained below, result in that the top section 406 expands radially, which as an effect provides for that the first group of ring elements 400 pushed in under the cell plate 106 such that these can abut an underside 408 of cell plate 106, and thereby securely fix the support cage 202 as described above. FIG. 4b illustrates a top view of the support cage 202, and FIG. 4c illustrates a perspective view of the support cage 202.

FIG. 5a to 5d illustrate the hook element 304 in further detail. As illustrated, the hook element 304 may be made of wire, which also may be the case for other parts of the support cage 202. This is advantageous from a hygienic point of view. By having the support cage 202 made of wires, e.g. stainless steel wires, a risk of having food residues stuck can be reduced. This especially holds true if the wires are spaced apart and if round wires are used.

As illustrated in FIG. 5a to 5d, the hook element 304 may be an element that is produced separately and thereafter attached to the other parts of the support cage 202. Before being attached to the other parts, the first group of ring elements 308, the second group of ring elements 400 and the third group of ring elements 402 may be attached, e.g. by welding, to a first leg 500a and a second leg 500b of a U-bent wire structure. By attaching to both legs, a form of the U-bent wire structure is fixated. In mounted position, the first and second legs 500a, 500b extend in axial direction A, as is illustrated in FIG. 4a.

The first leg 500a extends from a first radially extending section 502a, which joins a first axially extending section 504a that is radially spaced apart from the first leg 500a. The axially extending section 504a joins a tip section 506 which can be parallel with a circumference of the support cage 202. In a similar manner, the second leg 500b extends from a second radially extending section 502b, which in turn joins a second axially extending section 504b. The second axially extending section 504b joins the tip section 506, thereby connecting the first and second leg 500a, 500b. As illustrated in FIG. 4a, the tip section 506 is arranged to abut the cell plate 106 in the mounted position.

Figure 6A:
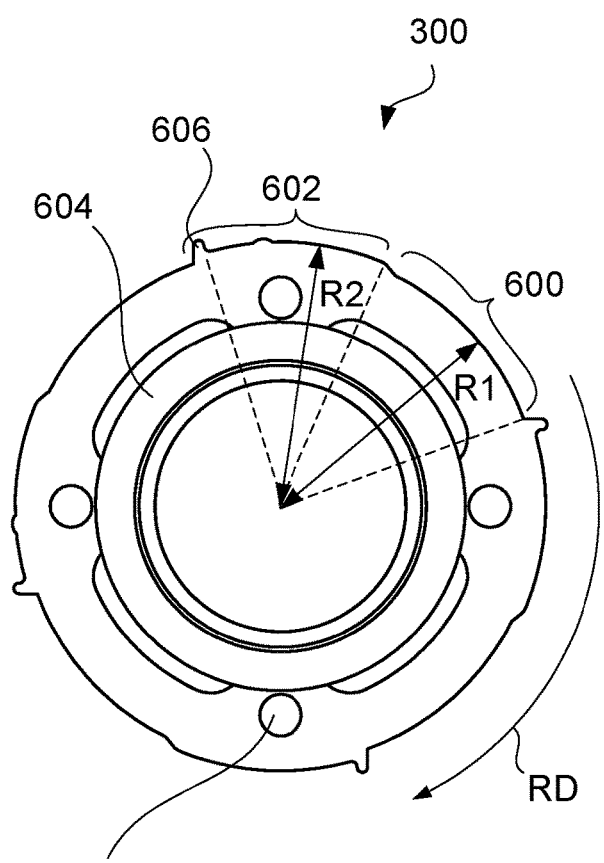
FIG. 6a is a top view of a lock ring of the filter bag support system.
Figure 6B:
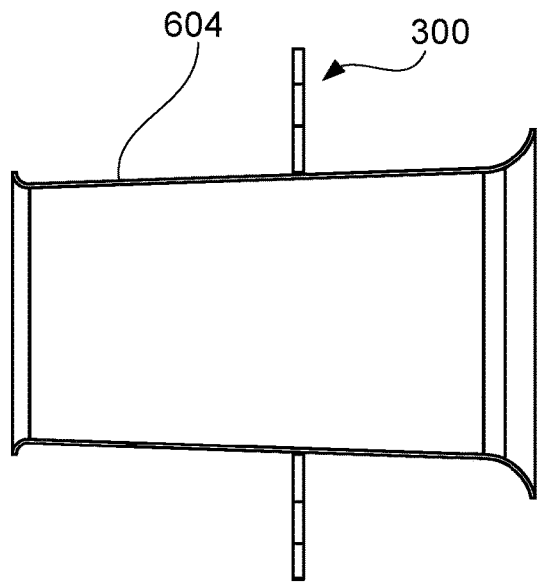
FIG. 6b is a side view of the lock ring.

FIGS. 6a and 6b illustrate the lock ring 300 in further detail from a top view and from a side view, respectively. The lock ring 300 has a first section 600 with a first radius R1 and a second section 602 with a second radius R2, wherein the second radius R2 is greater than the first radius R1. The lock ring 300 can comprise several first and second sections 600, 602. For instance, the lock ring 300 illustrated in FIG. 6a comprises four first sections and four second sections, placed alternately along a circumference of the lock ring 300.

A protrusion 606 is provided on the second section 602. An advantage with having the protrusion 606 is that when rotating the lock ring 300 with respect to the support cage 202 during an installation procedure, the protrusion 606 will hooks into a vertical wire of the support cage 202, e.g. the first or second leg 500a, 500b of the hook element 304 or into another wire that is located before the leg as seen in the rotational direction RD of the lock ring 300. I detail, to fixate the lock ring 300 to the support cage 202, the lock ring 300 is moved in the axial direction A to a position in between the third ring elements 402 and the fourth ring elements 404. This is done when having the second section 602 with the larger radius R2 aligned with the interspaces formed between the thirds ring elements 402. Thereafter the lock ring is rotated in the rotational direction RD so that the second section 602 is forced in between the space formed between the third ring elements 402 and the fourth ring elements 404. Due to the larger radius R2 the top section 406 of the support cage 202 is pressed out towards the edge 206 of the opening 204 of the cell plate 106. This effectively "clamps" the support cage 202 to the cell plate 106.

A funnel 604 may be provided in a mid-portion of the lock ring 300. The funnel 604 may be used for directing and amplifying air during a filter bag cleansing phase when air is fed to the clean air chamber 104, through the filter bags 110 and to the dirty chamber 108 for removing powder particles stuck on the filter bag 110. As illustrated, the funnel 604 may be a venturi nozzle. The cross sectional area of the funnel 604 decreases in a direction from the air chamber 104 to the dirty chamber 108.

Figure 7:
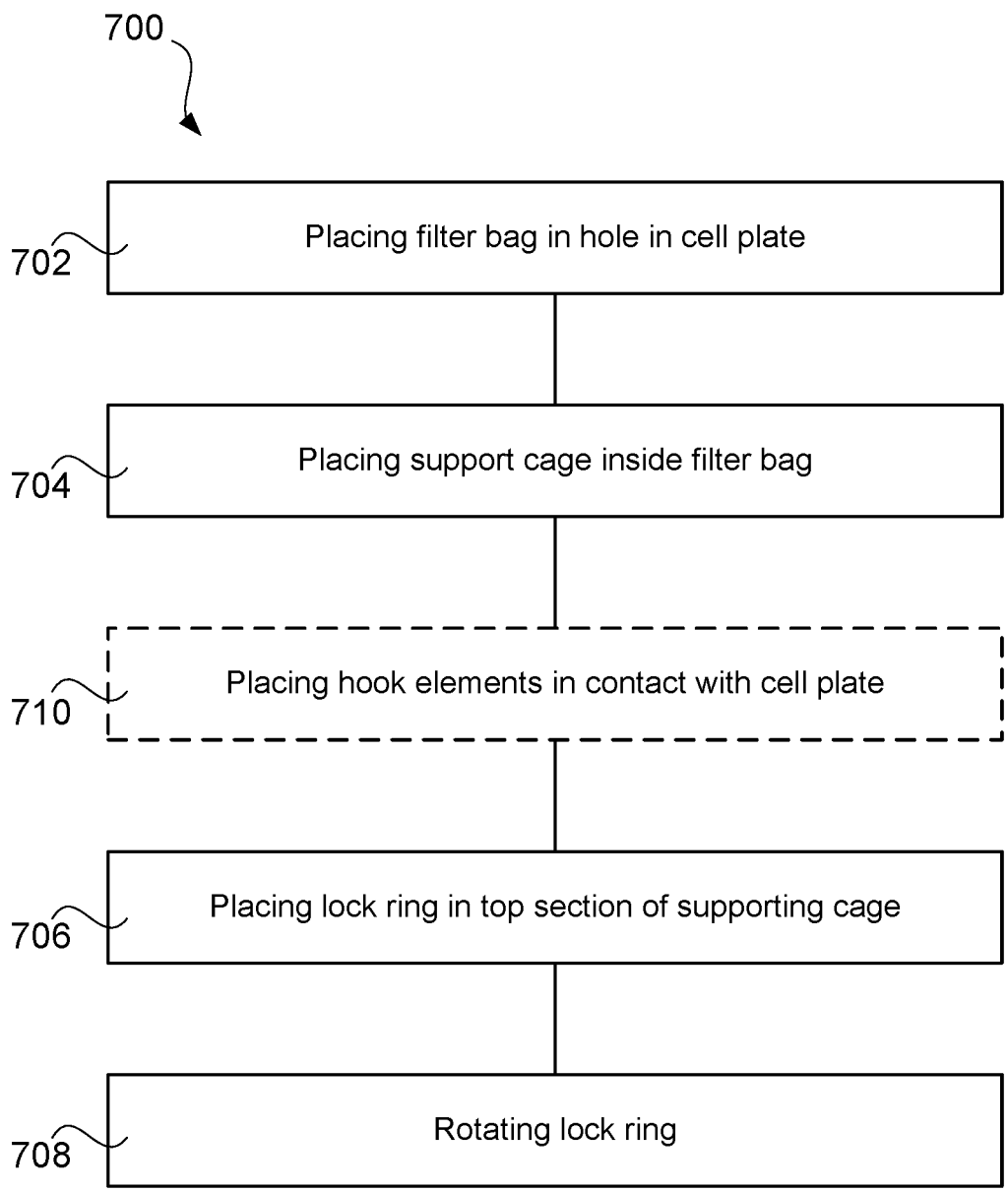
FIG. 7 is a flow chart illustrating steps of a method for installing a filter bag in a bag house equipment.

FIG. 7 is a flowchart illustrating steps of a method 700 for installing a filter bag 110. In a first step 702 the filter bag 110 is placed in the hole 302 in the cell plate 106, or is placed on the outside of the support cage 202. Thereafter, in a second step 704, the support cage 202 is pushed through the hole 302 in the cell plate 106. In a third step 706, the lock ring 300 is placed in the top section 406 of the support cage 202. As described above, the lock ring 300 may be provided with the first section 600 with the first radius R1 and the second section 602 with the second radius R2, wherein the second radius R2 is greater than the first radius R1, and the top section 406 of the support cage 202 is expandable in the radial direction R. In a fourth step 708, the lock ring 300 is rotated such that the filter bag 110 is clamped between the cell plate 106 and the support cage 202.

Optionally, in a fifth step 710, the hook elements 304 that extend in the radial direction R from the top section 406 and thereafter extends in the axial direction A can be placed such that the hook elements 304 rest on the cell plate 106 when the support cage 202 is placed in the hole 302 of the cell plate 106.

From the description above follows that, although various embodiments of the invention have been described and shown, the invention is not restricted thereto, but may also be embodied in other ways within the scope of the subject-matter defined in the following claims.

The invention claimed is:

1. A filter bag support system arranged to support a filter bag for separating food powder and air when the filter bag is placed in an opening of a cell plate of a bag house equipment, said filter bag support system comprising
a support cage arranged to be placed inside the filter bag, and
a lock ring arranged to be placed inside a top section of the support cage, wherein
the top section of the support cage is expandable in a radial direction, and
the lock ring is provided with a first section with a first radius and a second section with a second radius, wherein the second radius is greater than the first radius, wherein the second section is arranged to expand the top section of the support cage in the radial direction towards an edge of the opening of the cell plate when the lock ring is radially rotated within the top section, such that the filter bag is clamped between the cell plate and the support cage.

2. The filter bag support system according to claim 1, wherein the support cage comprises hook elements that extend in the radial direction from the top section and thereafter extends in the axial direction, such that the hook elements rest on the cell plate when the support cage is placed in the cell plate.

3. The filter bag support system according to claim 2, wherein the hook elements are provided with a first group of ring elements arranged to, in combination with the cell plate, fixate the filter bag.

4. The filter bag support system according to claim 3, wherein the top section is provided with a second group of ring segments arranged to be pressed against an underside of the cell plate such that the support cage is prevented to move in an axial direction by the first group of ring segments and the hook elements.

5. The filter bag support system according to claim 1, wherein the support cage is cylindrically shaped and comprises 6 to 30 longitudinal wires and horizontal reinforcement rings spaced apart by 40 to 300 mm.

6. The filter bag support system according to claim 4, wherein the top section of the support cage is provided with a third group of ring elements and a fourth group of ring elements arranged to fixate the lock ring.

7. The filter bag support system according to claim 6, wherein the fourth group of ring elements are provided with two to six slots to provide flexibility in the radial direction.

8. The filter bag support system according to claim 1, wherein the lock ring comprises a funnel for directing air.

9. The filter bag support system according to claim 8, wherein the funnel is a venturi nozzle.

10. The filter bag support system according to claim 1, wherein the lock ring is provided with at least two holes arranged to receive a mounting tool.

11. A bag house equipment comprising a cell plate provided with at least one filter bag support system according to claim 1.

12. A method for installing a filter bag in a bag house equipment, said method comprising
placing the filter bag in a hole in a cell plate of the bag house equipment,
placing a support cage inside the filter bag,
placing a lock ring in a top section of the support cage, wherein the lock ring is provided with a first section with a first radius and a second section with a second radius, wherein the second radius is greater than the first radius, and the top section of the support cage is expandable in a radial direction, and
radially rotating the lock ring such that the filter bag is clamped between the cell plate and the support cage.

13. The method according to claim 12, further comprising placing hook elements of the support cage that extend in the radial direction from the top section and thereafter extends in the axial direction, such that the hook elements rest on the cell plate when the support cage is placed in the cell plate.

14. The method according to claim 13, wherein the hook elements include a first group of ring segments, and wherein the top section is provided with a second group of ring segments arranged to be pressed against an underside of the cell plate such that the support cage is prevented to move in axial direction by the first group of ring segments and the hook elements.

15. The method according to claim 14, wherein the top section of the support cage is provided with a third group of ring elements and a fourth group of ring elements arranged to fixate the lock ring.

* * * * *